July 9, 1929.  G. J. THOMAS  1,719,858
BRAKE
Filed Nov. 3, 1924  4 Sheets-Sheet 1

INVENTOR
GEORGE J. THOMAS
BY
A. D. S. Libby
ATTORNEY

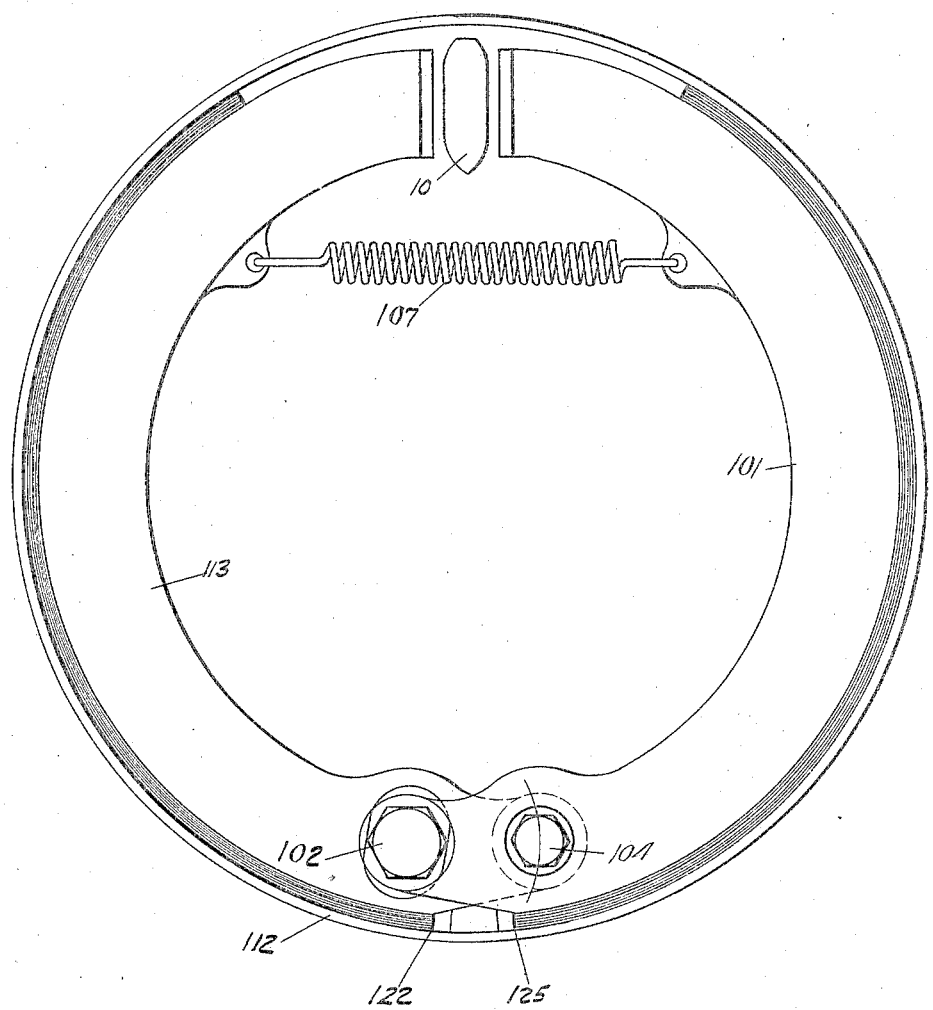

July 9, 1929.  G. J. THOMAS  1,719,858
BRAKE
Filed Nov. 3, 1924 4 Sheets-Sheet 3

INVENTOR
GEORGE J. THOMAS
BY
A. D. T. Libby
ATTORNEY

INVENTOR
GEORGE J. THOMAS
BY
A. D. J. Libby
ATTORNEY

Patented July 9, 1929.

1,719,858

UNITED STATES PATENT OFFICE.

GEORGE JOSEPH THOMAS, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed November 3, 1924. Serial No. 747,669.

This invention relates to improvements in brakes, and will be described as embodied in automobile brakes. As illustrated, the brakes are of the internal expanding type.

In the design of internal expanding brakes, the amount of braking surface which can be obtained on the brake shoes is limited to a great extent by the clearance which must be secured when the brakes are in released position.

My present invention is directed to the problem of increasing the braking surface of the shoes to a maximum, at the same time obtaining the necessary clearance to insure the brakes will not drag on the brake drum when the brakes are in released position.

Another object of my invention is to provide brake shoes of such form and construction that the general braking efficiency may be increased as well as the life of the brake lining used in connection with the brakes.

Other objects will be seen after a study of the specification and drawings, wherein Figure 1 shows an internal expanding brake utilizing three shoes which not only function in one direction so as to give self-energizing effect, but will also provide self-energizing action for the reverse direction. The brake actuating means is shown in the released position while the brakes are shown in engagement with the brake drum.

Figure 2 is an internal expanding brake showing two shoes in which my present invention is incorporated. The shoes and actuating means are shown in a similar position as in Fig. 1.

Figures 1, 7:
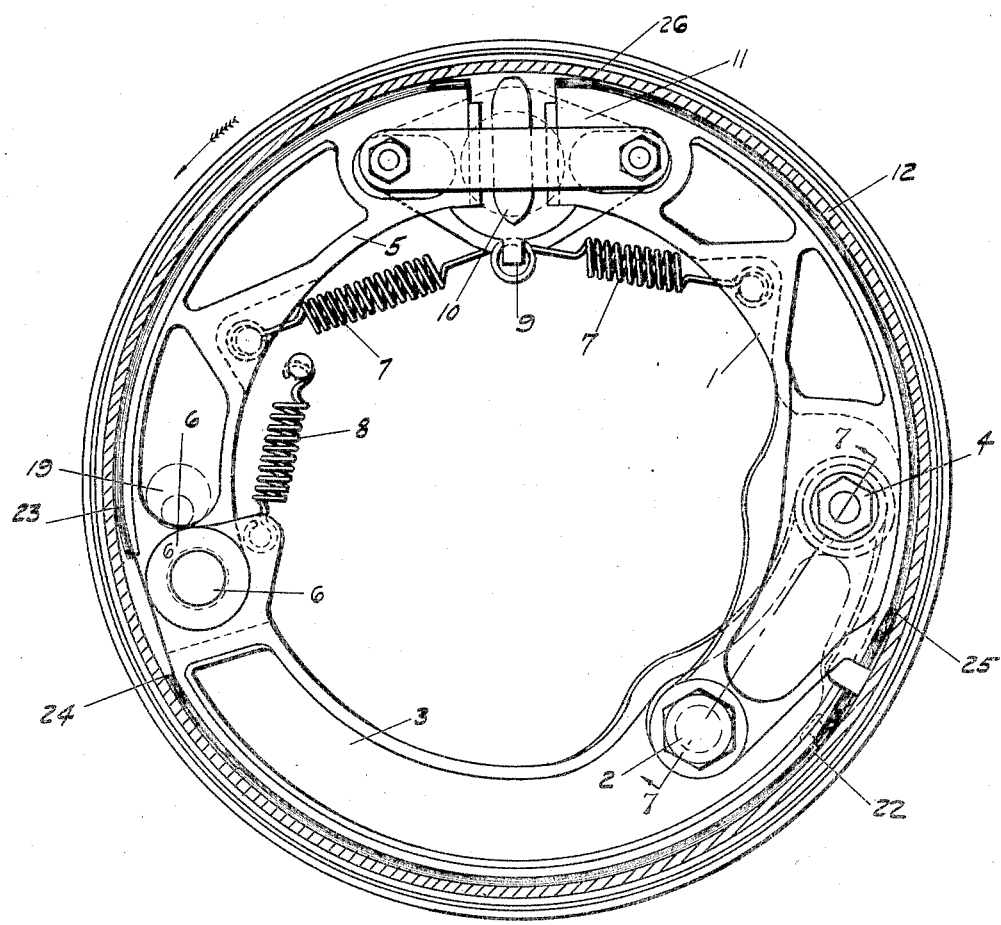
Figure 7 is a partial section on the line 7—7 of Figure 1, showing in detail the anchorage of the brake.
Figure 4:
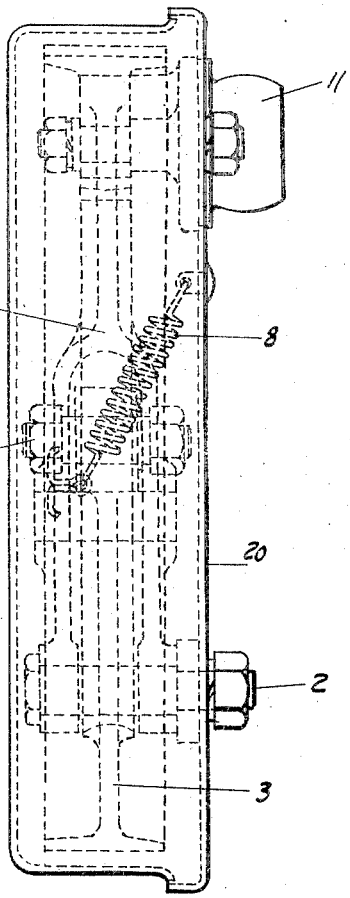
Figure 4 is a side view of Fig. 1.

In the drawings wherein like numbers refer to corresponding parts in the various views, 1 is a brake shoe pivoted to a brake supporting means by the pivot bolt 2. The brake shoe 3 has one end passing by the end of the brake shoe 1, and is pivoted to brake shoe 1 by an articulated joint at 4, as will be more clearly seen by reference to Fig. 4. Brake shoe 5 is pivoted to brake shoe 3 at 6 by any satisfactory articulating means. It is to be understood that the articulated joints 4 and 6 are not anchored to the brake supporting means in any manner. A spring 7, which may be anchored at 9, is attached to the shoes 1 and 5 to hold them in their retracted position. A spring 8 is attached at one end to brake shoe 3 near the articulated joint 6 in order to insure the release of this shoe from the brake drum; preferably, the spring 8 is set at an angle, as shown in Fig. 4, in order to draw the shoes 3 and 5 toward the brake shoe supporting means or backing plate 20 to prevent a rattle of the brake shoes, while the pivot at the articulated joint 6, is preferably in the form of a shouldered stud and the head of such stud is forced against the face of the supporting means by the action of said spring 8. A cam 10 or some equivalent means is carried on any suitable support, such as a bracket 11, and is utilized for operating the brake shoes. As shown in Fig. 1, the cam 10 is in released position while the brake shoes are shown in engagement with the brake drum 12.

Figure 3:
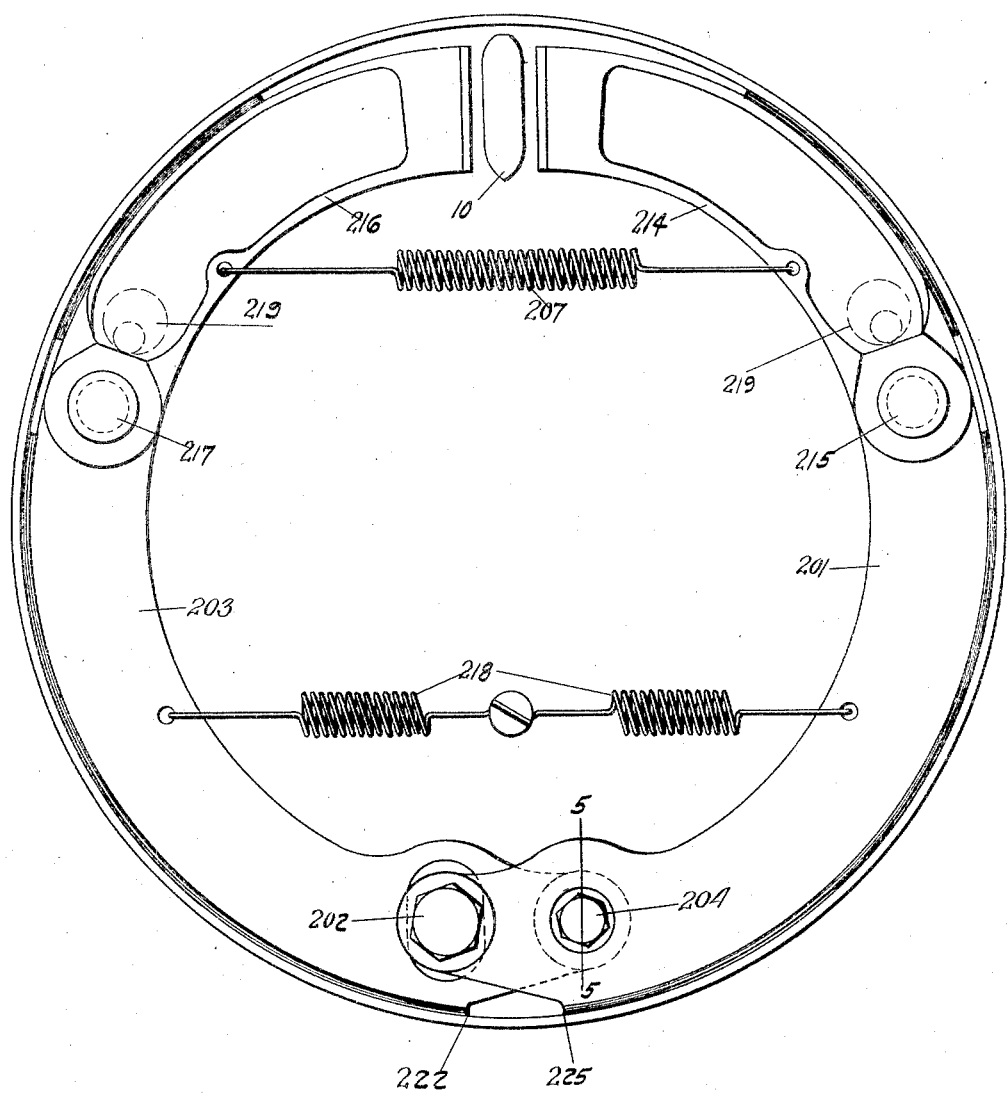
Figure 3 is a modification of Fig. 2 in which the two brake shoes are divided, each into two articulated shoes whereby the brakes are self energizing for either direction of rotation. The shoes and actuating means are shown in the same position as in Fig. 1.
Figure 5:
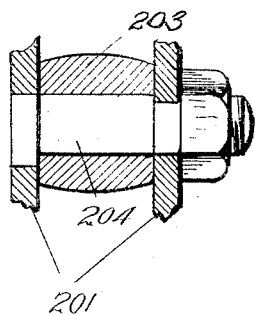
Figure 5 is a section on the line 5—5 of Fig. 3.
Figure 6:
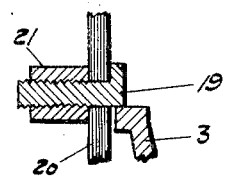
Figure 6 is a partial section on the line 6—6 of Fig. 1.

In Fig. 2 the brake shoe 113 is pivoted to the brake shoe 101 at point 104, the same as brake shoe 3 in Fig. 1 is pivoted to brake shoe 1, shoe 101 being anchored on a pivot 102 and the usual return spring 107 being connected between the shoes. In Fig. 3, the brake shoe 214 is articulated or pivoted to brake shoe 201 at the pivot point 215, and brake shoe 216 is articulated at point 217 to the brake shoe 203; spring 218 being utilized to retract the brake shoes 201 and 203 while the spring 207 acts on shoes 214 and 216. An adjustable device 219, preferably eccentric, is provided for adjusting the position of the articulated joints 215 and 217 in Fig. 3. An eccentric 19 acts in the same manner on the joint 6 in Fig. 1. As shown in Fig. 6 the eccentric is indicated by 19, which is carried on the backing plate 20 that serves to carry the brake. A nut 21 is used to lock the member 19 in any adjustable position. It is to be understood, of course, that the locking device may be of any suitable character. The joint at point 4 or 204, is also preferably adjustable and of the eccentric type as shown in Fig. 5, in order that the brake shoe may be adjusted to compensate for the wear of the brake lining.

The basic action, so far as my invention is concerned, is the same in all three forms of shoes shown and may be briefly described as follows:

Shoe 1, being anchored to the brake supporting means at the pivot 2, acts as a conventional brake shoe with respect to its clearance. The pivots 4 and 2 are positioned in overlapping relationship to each other as has been described. This arrangement of the pivot points 4 and 2 makes it possible to bring the ends of the brake lining on the two shoes very close to each other without reducing the clearance between the brake drum and the lining for a given angular movement of the brake shoes all as described in my previous application, Serial 743,877, filed Oct. 16, 1924.

The advantages of my improvement will now be fully appreciated when it is seen that the pivot point 4 or 104 of the shoe 3 or 113 moves on an arc about pivot 2 or 102, as the shoe 1 or 101 is drawn toward the brake actuating means 10. As this motion is away from the brake drum, the point 22 or 122 or 222, at the heel of shoe 3 or 113 or 203, will move away from the brake drum 12 causing additional clearance at this point more than the shoe 3 or 113 or 203 would have if the pivot 4 or 104 or 204 were on the brake supporting means. It is obvious that the result of this method of connecting the brake shoes is such that for a given movement of the brake actuating means, the brake shoes will increase or decrease their clearance with respect to the brake drum by a greater amount than would be possible with any form of simple pivot. This increase may be utilized in a number of ways depending on the particular design and construction required; for example, the leverage from the pedal to the actuating mechanism may be increased thus giving lighter pedal pressures, because, for the same clearance, the angular movement of the actuating mechanism may be reduced. My construction will also allow of less angular movement of actuating levers and therefore, their length may be increased without increasing pedal travel. From what has been said, it is to be understood that greater power may be obtained for a given pedal pressure; this is particularly true with respect to the brakes shown in Fig. 1 for the reason that as the movement of the brake actuating means 10, for a given clearance at 22, and consequently at 23 and 24, is reduced by this method of pivoting, more of the power of 10 may be applied to shoe 1 than with simple pivots if the movement of 10, in relation to shoe 5, be reduced to give a clearance at 22, such as is required with simple pivotal action.

It will also be seen that, in the arrangement of Fig. 1, the three shoes form a connected sub-assembly unit held only by the anchor 2.

In the various forms of brake mechanisms illustrated, brake shoes are set so as to be concentric with the drum when the brake is applied.

While several embodiments of the invention have been described in detail, it is not my intention to limit the scope of the invention to those particular embodiments, or otherwise than by the terms of the appended claims.

Having thus described my invention what I claim is:

1. A brake comprising, in combination, a drum, three brake shoes arranged to engage the same zone of the drum and jointly extending substantially around the inside of the drum, means for applying two of the shoes directly and the third through one of said two shoes, and a single pivot anchor arranged to take the torque of all three shoes.

2. A brake mechanism; including brake shoes having their pivot points arranged in over-lapping relationship, the pivot point for one shoe being moved on movement of the other shoe.

3. A brake mechanism; including brake shoes having their pivot points arranged in over-lapping relationship, the pivot for one shoe being carried on the other shoe.

4. A brake mechanism; including a plurality of brake shoes of the internal expanding type, at least two of said shoes having pivoted ends arranged in over-lapping relationship, the pivot for one of said two shoes being carried on and movable with the other of said two shoes.

5. A brake mechanism; including an actuating means and brake shoes having brake lining thereon, means for increasing the effectiveness of the shoes, comprising pivoted ends for the shoes arranged in over-lapping relationship to each other whereby the extremities of the brake lining at the heel of the shoes are brought close together, and means for increasing the clearance at the heel of at least one of said shoes, said means consisting of a movable connection between the shoes.

6. A brake mechanism comprising brake shoes of the internal expanding type, means for insuring contact at the heel of the shoes consisting of, arranging the pivot points at said shoe heels in over-lapping relationship, and means for increasing the clearance at the heel of at least one of said shoes, said means consisting of a pivot for one shoe on the other shoe.

7. A brake mechanism; including a plurality of brake shoes one of which may be of the self-energizing type and another an independent brake, said independent brake having a fixed anchorage while the self-energizing type of brake has a movable connection with the independent brake.

8. A brake mechanism, including a compound brake shoe consisting of a primary shoe and a secondary shoe jointed together, a single independent shoe having a fixed anchorage while a pivot for said secondary shoe is carried on the independent shoe at a point beyond said fixed anchorage away from said joint between the primary and secondary shoes.

9. In brake mechanism for engaging a rotatable drum, a self-energizing brake, an independent brake, means for causing both brakes to engage the drum, both brakes having pivoted ends arranged in over-lapping relationship, the pivot for one brake being fixed while the pivot for the other brake is movable with the brake having the fixed pivot.

10. In brake mechanism for engaging a rotatable drum, means for increasing the efficiency of said mechanism comprising overlapping brake shoes having separate pivots, one pivot being movable on movement of the other shoe.

11. In brake mechanism for engaging a rotatable drum, means for increasing the efficiency of said mechanism comprising overlapping brake shoes independently pivoted and actuated in opposite directions, the pivot for one shoe being carried on the other shoe.

12. In brake mechanism for engaging a rotatable drum, means for increasing the efficiency of said mechanism comprising overlapping brake shoes having separate pivots, the pivot for one shoe being movable away from the drum when the other shoe moves to released position.

13. In brake mechanism for engaging a rotatable drum, means for increasing the efficiency of said mechanism comprising overlapping brake shoes having separate pivots, the pivot for one shoe being fixed while the pivot for the other shoe is carried on the shoe having the fixed pivot, said pivot on the shoe being movable about the fixed pivot as a center.

14. A brake mechanism including a pair of overlapping brake shoes, a pivot for each of the shoes, one of the pivots being movable about the other as a center.

15. A brake mechanism, including a plurality of brake shoes, one of which may be of the self-energizing type and another an independent brake, said independent brake and one of the shoes of the self-energizing brake having their pivot points arranged in overlapping relationship, the pivot point of one of said shoes being carried on the other shoe.

16. A brake mechanism, including a compound brake shoe consisting of a primary shoe and a secondary shoe jointed together, a single independent shoe, the pivot points of said independent shoe and said secondary shoe being arranged in over-lapping relationship and the pivot point of one of the said last two mentioned shoes being carried on the other of said shoes.

17. A brake comprising, in combination, a drum, a central shoe within the drum, and a pair of pivoted end shoes, one at each end of the central shoe, each arranged to force the central shoe against the drum.

18. A brake comprising, in combination, a drum, a central shoe within the drum, a pair of end shoes, one at each end of the central shoe and at least one of which is mounted on a fixed pivot, both arranged to force the central shoe against the drum, means yieldingly urging the shoes away from the drum, and expanding means for forcing the end shoes apart against the drum.

19. A brake comprising, in combination, a drum, a central shoe within the drum, a pair of end shoes pivotally connected to the central shoe adjacent its opposite ends to form a jointed sub-assembly of three connected brake shoes capable of removal from the drum as a unit, and means for forcing the end shoes apart against the drum and causing the end shoes to force the central shoe against the drum.

20. A brake comprising, in combination, a drum, a central shoe within the drum, a pair of end shoes pivotally connected to the central shoe adjacent its opposite ends to form a sub-assembly of three connected brake shoes, means for forcing the end shoes apart against the drum and causing the end shoes to force the central shoe against the drum, and anchoring means taking the torque of all three shoes and arranged adjacent the connection between the central shoe and one of the end shoes.

21. A brake comprising, in combination, a drum, a plurality of shoes within the drum, one of which is forked at its end to form a pair of arms straddling and overlapping the end of the adjacent shoe, a pivot connecting the end of one of said overlapping shoes to the other shoe intermediate its ends, and an anchor for one end of said other shoe.

22. A brake comprising, in combination, a drum, a plurality of shoes within the drum, one of which is formed at its end with a part overlapping the end of the adjacent shoe, a pivot connecting the end of one of said overlapping shoes to the other shoe intermediate its ends, and an anchor for the overlapped end of said other shoe.

23. An internal expanding brake comprising, in combination, a drum, a plurality of shoes including a pair of end shoes and at least one intermediate shoe, a single pivot arranged to take the braking torque of all of the shoes, and an expanding device acting directly on the end shoes to force them apart against the drum and acting indirectly on the intermediate shoe through the end shoes to force the intermediate shoe against the drum.

24. A brake comprising, in combination, a drum, a plurality of pivotally connected shoes forming a jointed sub-assembly unit including a pair of end shoes and at least one intermediate shoe and capable of removal from the drum without separation of the shoes, and a brake-applying device acting directly on the end shoes to force them in opposite directions against the drum and acting indirectly on the intermediate shoe through the end shoes to force the intermediate shoe against the drum.

25. A brake comprising a plurality of pivotally connected shoes forming a sub-assembly unit including a pair of end shoes and at least one intermediate shoe, and in combination therewith, brake-applying means, and means for taking the torque of all of the shoes from the connected end of one of the end shoes.

26. A brake comprising a plurality of pivotally connected shoes forming a sub-assembly unit including a pair of end shoes and at least one intermediate shoe, and in combination therewith, brake-applying means, and means for taking the torque of all of the shoes arranged adjacent the connected ends of the intermediate shoe and one of the end shoes.

27. A brake comprising a plurality of pivotally connected shoes forming a sub-assembly unit including a pair of end shoes and at least one intermediate shoe, and in combination therewith, brake-applying means, and a single stationary device taking the braking torque of one of the shoes directly and taking the braking torque of the other two shoes through said one shoe.

28. A brake comprising a pair of end shoes and an intermediate shoe applied by the end shoes, in combination with a single pivot serving as an anchor for all of the shoes.

29. A brake comprising a shoe anchored at one end, in combination with another shoe having one end extending past the anchored end of the first shoe and operated at said end by said first shoe to be moved to operative position in applying the brake.

30. A brake comprising a shoe anchored at one end, in combination with another shoe having one end extending past the anchored end of the first shoe and operated at said end by said first shoe to be moved to operative position in applying the brake, together with a third shoe at the opposite end of the second shoe and arranged to move said opposite end to operative position in applying the brake.

31. A brake comprising, in combination, a drum, three shoes having their friction faces arranged end to end and engageable with substantially the entire circumference of the drum, and a common anchor for the three shoes.

In testimony whereof, I affix my signature.

GEORGE JOSEPH THOMAS.